United States Patent Office 2,995,233
Patented Aug. 8, 1961

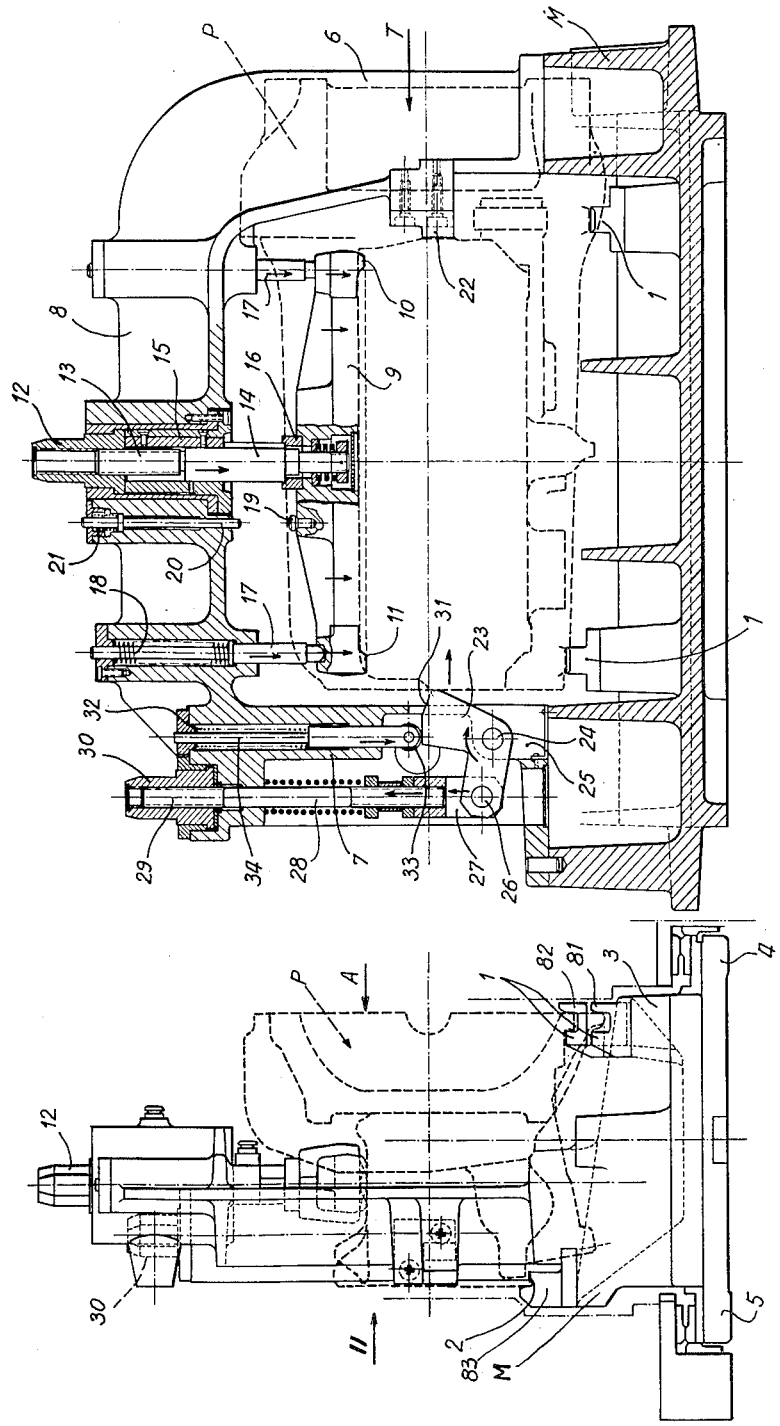

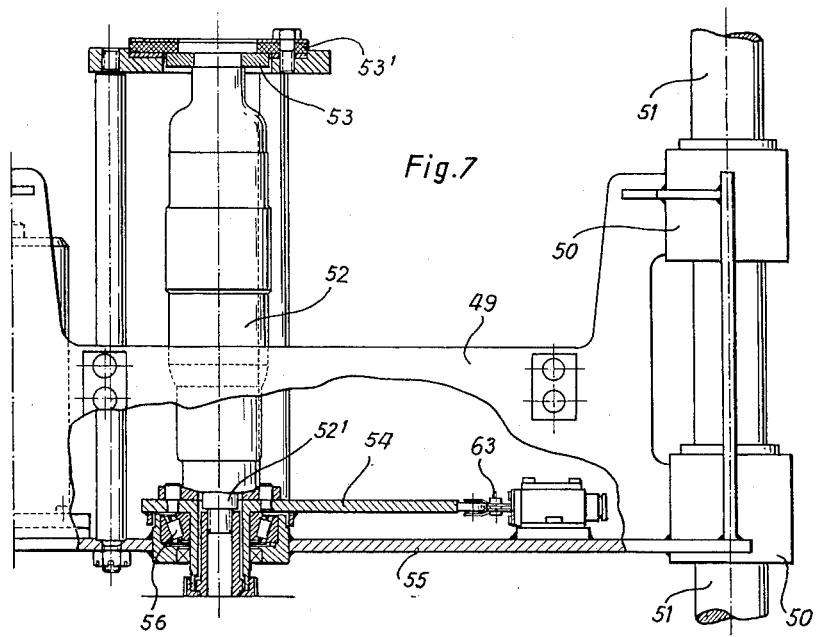
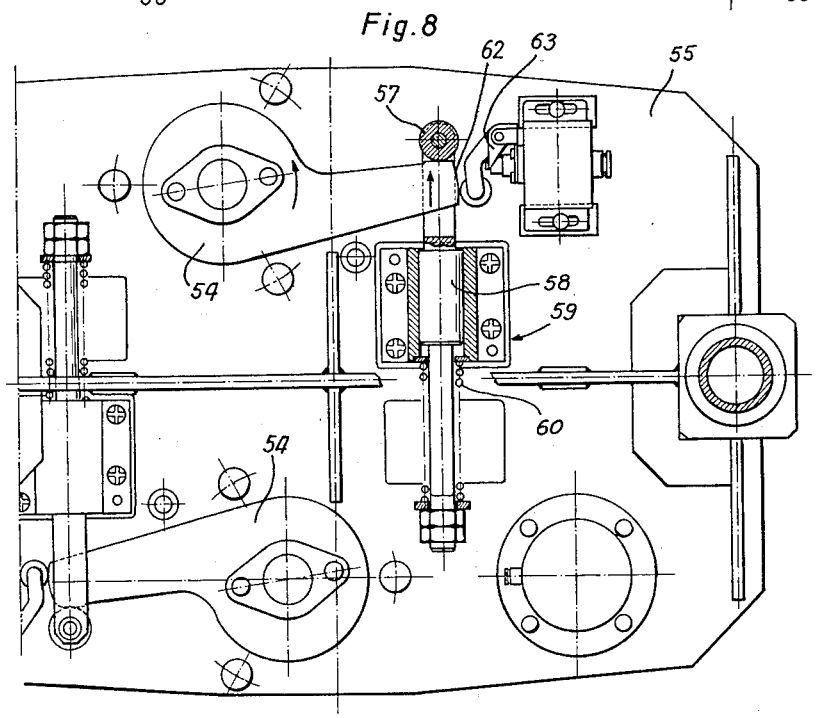

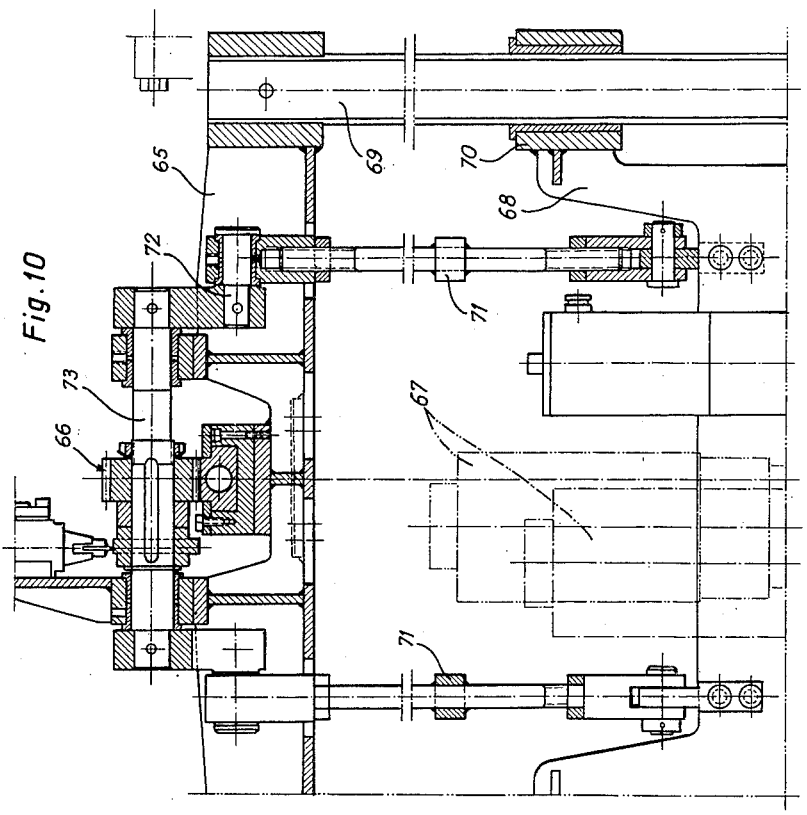
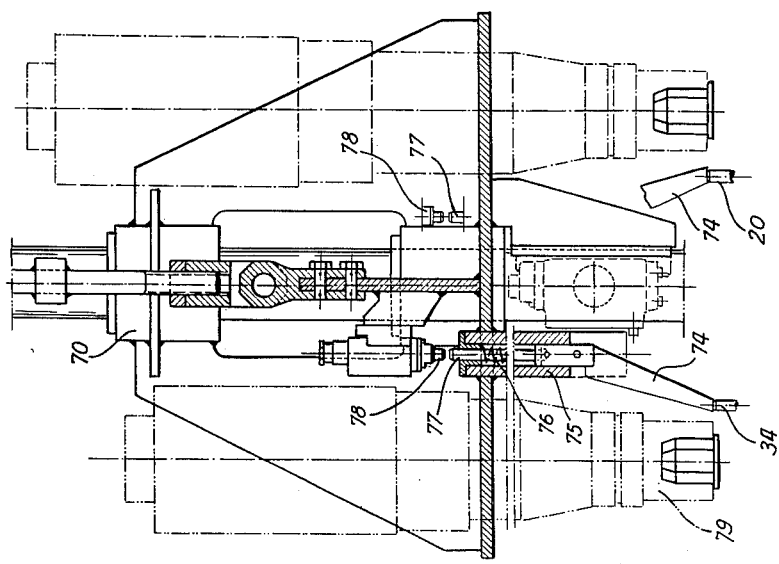

2,995,233
AUTOMATIC DEVICE FOR THE CLAMPING, UNCLAMPING AND CONTROLLED POSITIONING OF A WORKPIECE IN ITS MACHINING MOUNTING
Lucien Péras, Billancourt, France, assignor to Regie Nationale des Usines Renault, Billancourt, France, a French Government works
Filed June 18, 1957, Ser. No. 666,362
Claims priority, application France July 5, 1956
4 Claims. (Cl. 198—19)

Many automatic machines, such as transfer machines, require the use of a work support, hereinafter called a work-support unit in which the workpiece is fixed before being introduced into the machine.

This operation is very complicated and so is usually performed manually, for the workpiece must be suitably orientated, positioned accurately on the bearing surfaces of the work-support unit and clamped with a force insufficient to deform the workpiece, before being introduced into the machine.

This invention relates to the construction of an automatic device so designed that a workpiece suitably positioned on its work-support unit can be centered on the stops thereof and have its position checked, whereafter it is suitably clamped before machining and unclamped after machining.

To this end, the apparatus according to the invention comprises various devices:

A supervisory device is provided including a mechanical assembly to which is imparted a guided rectilinear motion and which can approach to within a predetermined distance of the workpiece. The mechanical assembly comprises a resilient thrust member more particularly for urging the workpiece along one of the work-support unit axes against one or more appropriate lateral stops thereof, independently of the position in which the mechanical assembly has stopped, the same also comprising check or supervisory members which check the position of the workpiece relative to the said axis of the work-support unit, contactors operated by the check members so that, if the workpiece is correctly positioned, the assembly consisting of the work-support unit and the workpiece is conveyed to a clamping station.

A clamping device is provided which comprises rotary drive devices operated and driven so as to operate rotary drivable elements or members for clamping the workpiece in its work-supporting unit. The clamping members helps urge the workpiece along an axis of the work-support unit other than the aforesaid axis and against one or more appropriate lateral stops of the work-support unit in order that the workpiece may be accurately centered in the work-support unit before being finally clamped. Stop members are provided to stop the rotary drive devices as soon as the clamping members exert a predetermined clamping torque.

An unclamping device is provided comprising rotary drive devices operated and driven so as to operate the clamping members when the workpiece has been machined, in order to remove the same. Stop members are provided to stop the last-mentioned rotary drive devices when the clamping members reach the end of their travel.

Particulars of the invention will in any case become more clearly apparent from an embodiment to be described hereinafter by way of example with reference to the machining of a motor vehicle engine crankcase.

In the accompanying drawings:

FIG. 1 is an end side elevation taken in the direction in which the workpiece, illustrated as a crankcase, is supplied, the crankcase being illustrated in position in its work-support unit;

FIG. 2 is a side elevation view from the side taken in the direction of arrow II of FIG. 1 in relation to the direction in which the work-support unit and casing are transferred, with partial vertical sections through the work-support unit, taken along the axis of the main members thereof;

FIG. 7 is a front elevation view taken in the direction of transfer but with some parts removed and with partial sectioning of the device for clamping the crankcase in its work-support unit;

FIG. 8 is a detailed plan view of parts of the clamping device shown in FIG. 6;

FIG. 10 is a front elevation view taken in the direction of transfer with a partial section of the unclamping device;

FIG. 11 is a view from the side, in relation to the transfer direction with partial sectioning of the unclamping device shown in FIG. 9;

Figure 3:
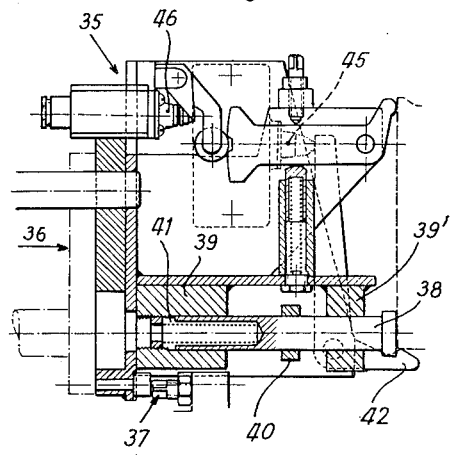
FIG. 3 is a side elevation view with a vertical section through the axis of the device for checking the position of the crankcase in its work-support unit.
Figure 5:
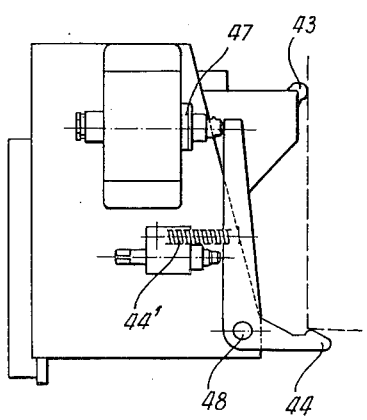
FIG. 5 is an external side elevation view of the device shown in FIG. 3.
Figure 4:
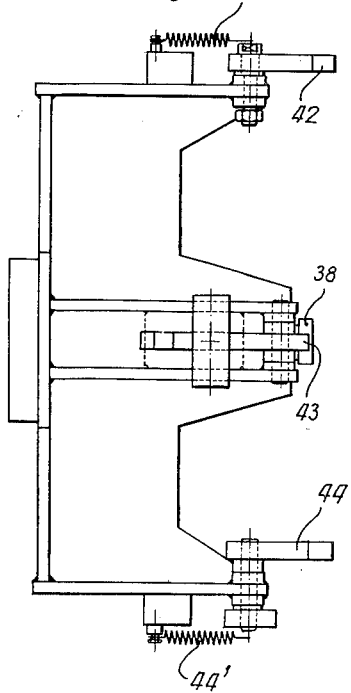
FIG. 4 is a simplified plan view of the members of the device illustrated in FIG. 3.
Figure 6:
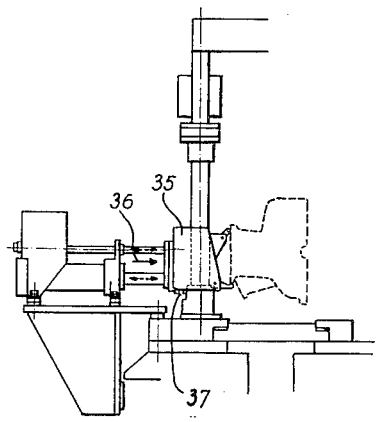
FIG. 6 is an external overall view of the work-support unit of the device of FIGS. 3 and 5 at the checking station.

Referring to FIGS. 1 and 2, a workpiece, for example a crankcase P is shown as being clamped in a work-support unit M. It will be apparent that the bottom of the crankcase P rests upon appropriate bearing surfaces 1 and 2 on either side of the work-support unit M, the crankcase P having been supplied in the direction of the screw A and then positioned on the bearing surfaces or supports 1 and 2.

The work-support unit comprises a base 3 adapted to move over a track (not shown) in a transfer direction T. To this end, the bottom of the base 3 is formed with two carefully trued surfaces 4 and 5.

Secured to the base 3 are two uprights 6 and 7 supporting a cross-piece 8 which forms the top of the work-support unit and in which slides a flange 9 adapted to hold the crankcase at the top thereof by being applied thereto by stops 10 and 11.

Vertical movement of the flange 9 is controlled by the rotation of a loose nut 12 which projects from the top of the crosspiece 8 and co-operates with a threaded rotary element 13 rigidly secured to a ram 14 connected to the flange 9 and moving in a bushing 15 borne by the crosspiece 8. During such vertical movement, the flange 9, which is articulated at its center to the ram 14 by way of a ball joint 16 so as to be applied appropriately to the crankcase P, is prevented from rotating in the horizontal plane by two columns 17 which are adapted to slide in the crosspiece 8 and engaged thereagainst by springs 18.

As the flange 9 rises, a finger 20 adapted to slide vertically in the crosspiece 8 and urged downwardly by a spring 21 can be caused to project by a predetermined amount by means of a stop 19 on the flange 9.

It will also be apparent from FIG. 2 that the crankcase P is maintained laterally in the transfer direction between a fixed stop 22 borne by the upright 6 and a moving bearing member 23 pivotable around a spindle 24 borne by a yoke 25 of the upright 7. The bearing member 23, which is two-armed, has one arm connected by a spindle 26 to a yoke 27 secured to the bottom of a rod 28 adapted to slide in the uprights 7. The rod 28 is screw-threaded at the top 29 and co-operates at the top with a loose nut 30 projecting from the top of the upright 7, rotation of the nut 30 thus causing the rod 28 to move vertically.

The other arm of the bearing member 23 takes the form of a cam 31 against which a spring 32 constantly urges a roller 33 of a finger 34 adapted to slide vertically in the upright 7, the finger 34 being adapted to project from the top of the upright 7 in dependence upon the movement of the bearing member 23.

The device for checking the positioning of the crankcase in its work-support unit is shown in FIGS. 3 to 6. This device comprises a moving assembly 35 guided and operated in any suitable way so as to engage, in the direction indicated by the arrow 36, with the crankcase at a suitable time, for checking the position thereof. The advance of the assembly 35 is limited by an adjustable stop 37 associated with the stationary frame of the checking station.

The moving assembly 35 comprises a combined piston and push-rod 38 guided in bores 39 and $39^1$ and having its movement towards the latter limited by a stop 40, the combined piston and push-rod 38 being adapted to be engaged resiliently by its spring 41 with the crankcase to be checked, independently of the advance of the moving assembly limited by the adjustable stop 37. The check members proper comprise three articulated feelers 42, 43 and 44 having return and adjusting members $42^1$, $43^1$ and $44^1$. The feelers are disposed, for example, at the three corners of a triangle and each feeler is connected to contactors 45, 46, 47. The articulations 48 of the feelers 42 to 44 are so positioned that a lever arm amplification is produced.

Figure 9:
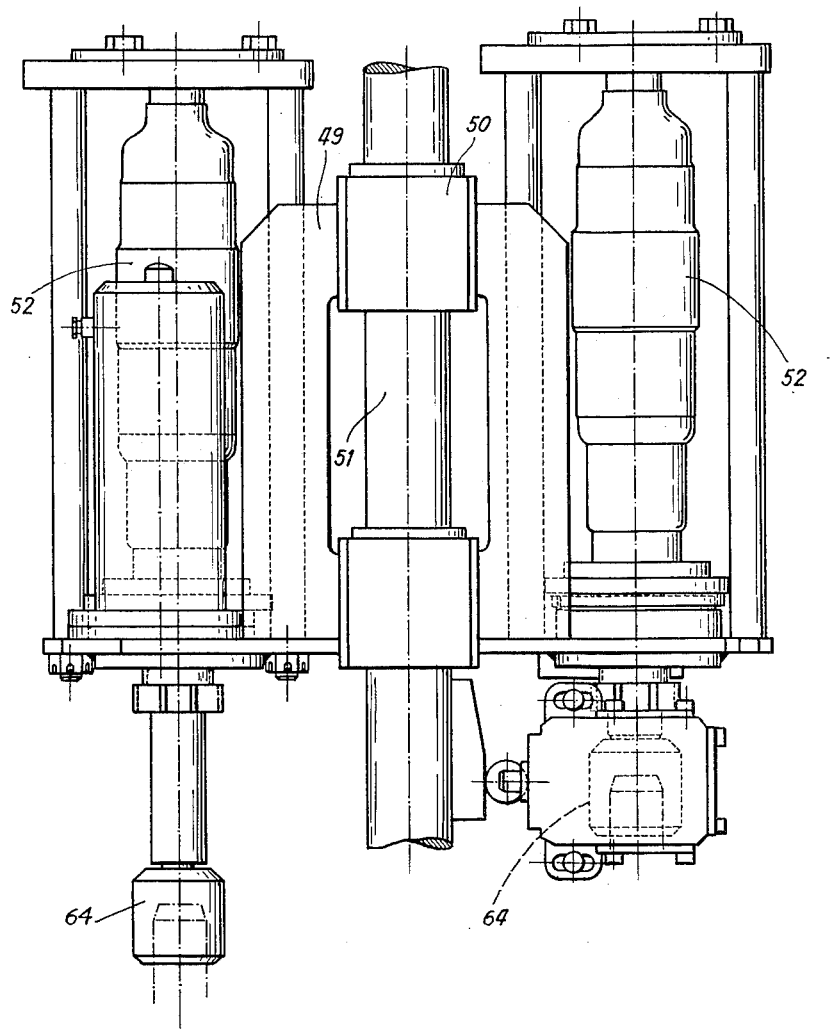
FIG. 9 is an external view from the side, in relation to transfer direction, of the clamping device shown in FIG. 6.

Referring to FIGS. 7, 8 and 9, the clamping device mainly comprises a support 49 adapted to slide on rings 50 on the columns 51 of the frame of the clamping station (not shown), the support 49 bearing two rotary drive devices 52. The same can therefore be moved vertically in translation by any suitable known device. The body of each rotary drive device can rotate freely to some extent by virtue of the following arrangement. The top of the rotary drive device is fitted in a disc 53 formed with a bore allowing the body of the rotary drive device to rotate around its vertical axis. This disc 53 is held by the pressure of a resilient support $53^1$ which allows the rotary drive device some vertical play. The bottom of the rotary drive device is fixed to a crank arm 54 freely rotatable around, and concentric to the shaft $52^1$ of the rotary drive device and relative to a plate 55 of the support 49 by way of a roller bearing 56. The end of the crank arm 54 is normally maintained by a stop 57 in a recess in a moving member 58 of a dynamometer 59. The same is urged by a spring 60 into the inoperative position, in the direction indicated by an arrow 61. The crank arm has a cam-shaped end 62 co-operating with the roller of a contactor 63. Each rotary drive device has a spanner 64 adapted to the nuts 12 and 30 of the work-support unit M.

The unclamping device is shown in FIGS. 10 and 11. It is formed by a bridge, the top crosspiece 65 of which bears the mechanism 66 for imparting a vertical translational movement to impact rotary drive devices 67. The drive devices are held by a moving crosspiece 68 adapted to slide vertically on columns 69 of the bridge through the intermediary of rings 70. The moving crosspiece 68 can be raised or lowered by rods 71 which connect the crosspiece 68 to eccentrics 72 fitted to a shaft 73. The shaft 73 is rotated by any suitable means such as a jack comprising a toothed rack meshing with a pinion.

Referring to FIG. 11, the crosspiece supports a mechanism, the feelers 74 of which slide in barrels 75 and are urged into the bottom position by springs 76. The tops 77 of the feelers 74 cooperate with contactors 78 for stopping the rotary drive devices. The drive devices have spanners 79 adaptable to engage the nuts 12 and 30 of the work-support unit M.

The complete device operates as follows:

First, the crankcase P is placed in its work-support unit manually or by means of an automatic device not shown. Thereafter the checking device advances automatically towards the crankcase to check the position thereof in the work-support unit, the checking device advancing in the direction indicated by the arrow 36.

In the moving assembly 35, the piston 38 urged by the spring 41 engages initially with the vertical plane surface 80 of the crankcase (FIG. 3) and urges the crankcase against the opposite lateral stops 81 and 82 of the work-support unit (FIG. 1). The stop 83 is used only during the preceding phase of supplying the crankcase and in the subsequent phase after the crankcase has been unclamped.

When the moving assembly 35 reaches the end of its travel (FIG. 3), the final position thereof being determined by the adjustable stop 37, the two bottom feelers 42 and 44 first engage with the machined bottom edges of the crankcase and tilt in the direction indicated by the arrows, whereafter the upper feeler 43 abuts the crankcase, thus giving an accurate indication of whether or not the plane surface 80 is correctly positioned vertically.

If the crankcase is incorrectly positioned, the contacts 42, 43 and 44 will not normally close and the machine will be stopped. If the crankcase is correctly positioned, the contactor assembly 45, 46 and 47 will operate so that the work-support unit and crankcase can be conveyed to the clamping station in the transfer direction T.

When the work-support unit has been suitably stopped at the clamping station (FIG. 2), the two rotary drive devices 52 descend and the spanners 54 thereof engage with the loose nuts 12 and 30 of the work-support unit. When the support 49 is in the bottom position, the rotary drive devices 52 start to rotate and cause the movement, in the direction indicated by the arrows, of the threaded rotary drivable elements comprising parts 13 and 29, which cannot rotate, and therefore the movement of the rod 14 and rod 28. The rod 28 drives the bearing member 23 which lowers the finger 34 and urges the crankcase to the right against the stop 22.

Thereafter the crankcase is correctly positioned in its work-support unit against the appropriate lateral stops, 22, 81, 82 and, of course, the member 23.

When the crankcase has reached the stop 22, the nut 30 and the shaft of the rotary drive device are no longer free to rotate, so that the body of the drive device starts to rotate and moves, in the direction indicated by the arrows, the crank arm 54 (FIG. 8), that arm thereof retained by the dynamometer 59 first helping to produce a correct clamping torque. Also, when the crank arm 54 has rotated through a certain angle, its camming part 62 operates the stop contactor 63 of the rotary drive device concerned (position illustrated in FIG. 8).

Similar considerations apply to the retaining flange 9 which is moved by its rod 14 and bears by way of the stops 10 and 11 against the crankcase, so that when the nut 12 cannot rotate any more, the rotary drive device thereof stops in the manner hereinbefore described.

It will be apparent that, for the crankcase to be correctly positioned, the drive device operating the bearing member 33 should cease to operate before the rotary drive device associated with the flange 9. To this end, each of the two rotary drive devices concerned should have sufficiently different travels or operating times.

After this operation the work-support unit and the crankcase secured thereto are conveyed to the various machining stations whereafter they finally reach the unclamping station. When the work-support unit is in position at the unclamping station, the mechanism 66 lowers the moving crosspiece 68, and the spanners 79 of the impact rotary drive devices 67 engage with the nuts 12 and 30 of the work-support unit. When the drive devices 68 reach the bottom position, they beging to operate in such a way that the rod 28 and ram 14 are driven in the direction opposite to that indicated by the arrows of FIG. 2.

When the rod 28 reaches the end of its travel, the camming part 31 of the bearing member 23 which moves away from the crankcase causes the finger 34 to project from the top of the work-support unit. The finger 34 therefore operates the feeler 74 which, through the agency of the contactor 78, causes the stoppage of the corresponding rotary drive device (FIG. 11).

Similarly, when the flange 9 reaches the end of its travel, the stop 19 raises the finger 20 which operates the other feeler 74 to stop the second rotary drive device.

After the work-support unit and crankcase have been unclamped, they are removed. For instance, the crankcase is removed by a method similar to that used to bring it to the station in its work-support unit.

Of course, in this automatic device the contactors and the various driving mechanisms responsible for the movements mentioned can be embodied in any known and suitable manner with a view to complete synchronisation of the various operations, in accordance with techniques conventional in this field.

Figure 13:
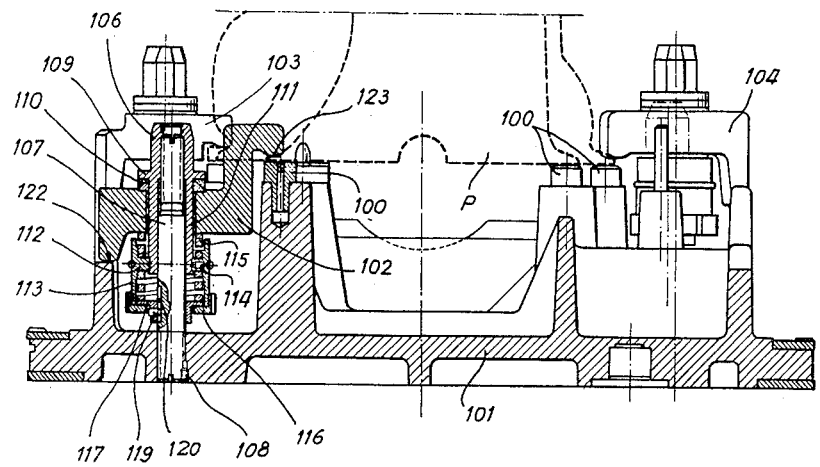
FIG. 13 is a sectional view of the variant shown in FIG. 12 and taken along the line XIII—XIII of FIG. 12.
Figure 12:
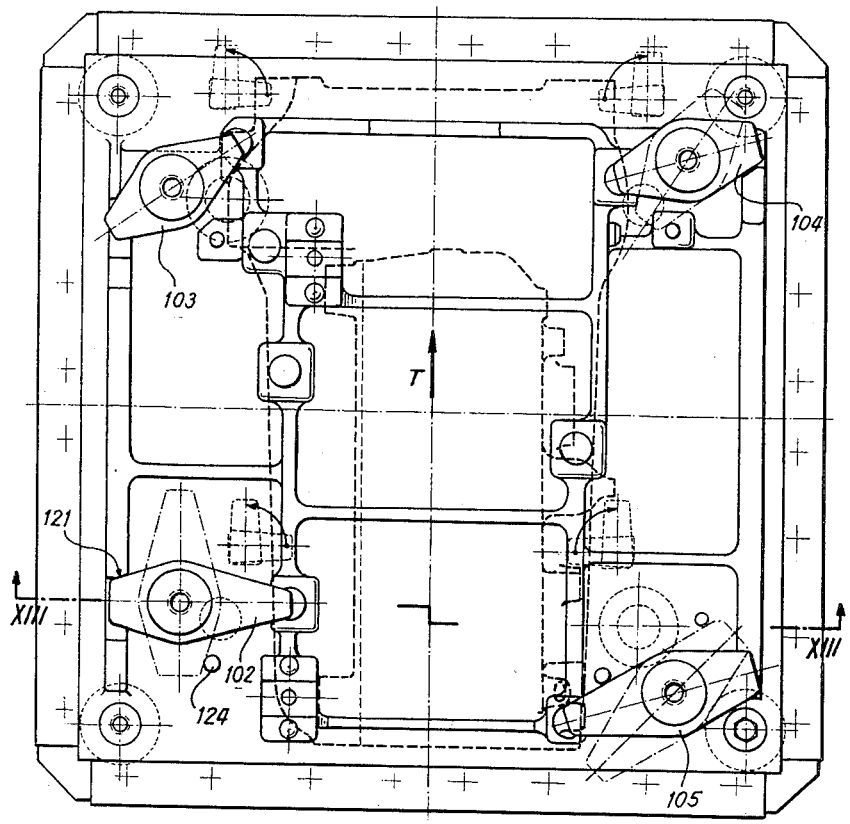
FIG. 12 is a plan view of a variant of a part of the clamping device adapted to the case where the work-support unit is formed by a base without superstructure.

A variant of a part of the clamping and unclamping device, suitable for the case where the work-support unit is, for various reasons such as machining services, formed merely by a base without superstructure on which the workpiece is first centered in any suitable manner, is shown in FIGS. 12 and 13. In this case clamping members are provided which engage at the level of the workpiece base and which can be retracted so that the workpiece can be readily positioned on and removed from the work-support unit.

It will be apparent from FIGS. 12 and 13 that the crankcase P rests on appropriate bearing surfaces 100 borne by the base 101 of the work-support unit. The crankcase is maintained thereon by pivotable clamping flanges 102 to 105.

Although possibly being of different forms, these flanges have in this case an identical control device specially shown in section, in the position corresponding to clamping by the flange 102, in FIG. 13. Disposed in the top of this device is a nut 106 which is operated by a rotary drive device of the type hereinbefore described to operate the flange 102. The nut 106 is connected to the top and screwthreaded part of a stud 107 screwed firmly at the bottom into the mounting base 101 and locked by a pin 108. In the center of the nut 106 is a collar 109 against which the flange 102 bears, as will be seen hereinafter, by way of a ball joint 110. The bottom part 111 of the nut 106 forms a guide along the stud 107 and is externally screwthreaded to receive the shoulder 112 of a spring box 113 located by a pin 114. A spring 15 disposed between the shoulder 112 and the flange 102 applies the ball joint 110 firmly to the flange 102. Also, a locked nut 116 forms the base of the spring box 113 against which a friction disc 117 is applied by a second spring 118 weaker than the spring 115. The disc 117 is maintained solid in rotation by a key 119 disposed in a rectilinear groove 120 in the stud 107, so that the disc 117 can slide lengthwise along the stud 107.

This device operates as follows:

First, the flange 102 is placed in the unclamped position outside the space taken up by the crankcase P (position shown in chain lines in FIG. 12) and the crankcase is then positioned on its work-support unit, whereafter the drive device engages with the nut 106 and then rotates it.

During this movement (FIG. 13) the nut 106 descends by screwing itself along the stud 107 and, as it rotates, drives the spring box 113. The flange 102, since one of its surfaces is subjected to the friction of the spring 115 and since it can slide easily on its other surface because of the ball joint 110, is rotated until it abuts the stop 121 on the work-support unit, the last-mentioned stop being disposed in dependence upon the position where the flange is required to engage with the crankcase (position shown in solid lines in FIG. 12).

As soon as the flange 102 has stopped rotating, the spring 115 slides to its contact and to that of the shoulder 112, while the nut 106 continues to descend in order to produce the required clamping of the flange against the crankcase P. During this clamping phase, the flange can take up a suitable orientation because of the ball joint 110 and of the spherical shape of its two bearing surfaces—the surface 122 on the base 101 and the surface 123 on the crankcase P. Finally, when a predetermined clamping torque has been produced, the rotary drive device is stopped automatically in the manner hereinbefore described with reference to the drive devices 52.

Unclamping is performed in identical manner the nut 106 being driven in the opposite direction by a rotary drive device. After the unclamping proper, the flange again pivots around the stud 107 to abut a contactor (not shown) adapted to stop the rotary drive device and suitably disposed at the unclamping station, the base of the work-support unit also bearing a stop 124 for stopping the unclamped flange (FIG. 12).

To ensure that, when in the unclamped position, the control device and the flange cannot be moved by vibrations or an accidental shock, the movement of the spring box 113 is retarded by the friction disc 117 which is fixed in rotation and urged by the spring 118 against the base 116 of the spring box 113, so that the nut 106 and flange 102 are braked.

Of course, this embodiment has been mainly described by way of example and the engineer in the art can devise variants without departing from the scope of the invention.

I claim:

1. In a work-handling apparatus for a machine tool process line having a plurality of work stations at which machine operations are carried out on a plurality of like workpieces mounted in a clamped manner on respective like work-support units, said work-support units having first clamp means including first rotary drivable elements to clamp a workpiece therein to hold the workpiece from up and down movement and second clamp means including second rotary drivable elements to move the workpiece laterally and hold it from lateral movement, the improvement which comprises, means defining a work station for receiving successively a plurality of like workpieces mounted on respective like work-support units in an unclamped condition, a clamping arrangement at the last-mentioned station forming a clamping station to clamp the individual workpieces on the respective work-support units comprising, a pair of rotary drive devices positionable in operative positions jointly to rotatably drive the rotatable elements of the first and second clamp means respectively, a support member mounting the two devices and automatically movable to an operative position in which the drive devices are in respective engagement with the rotatable elements of said clamp means and automatically movable to a retracted position in which the drive devices are disengaged from the rotatable elements of the respective clamp means, means responsive to the successive reception of the work-support units at the clamping station to automatically rotatably operate the drive devices when engaged with said rotatable elements to move the workpiece laterally to a predetermined position in the respective unit and clamp it to keep it from lateral movement and to clamp it and keep it from up and down movement, said devices having rotary driving members engageable with said drivable elements automatically stoppable when the workpiece is clamped in said position and other rotary driving members operable automatically to apply a predetermined torque to the first-mentioned rotatable driven elements of the work-supporting units and automatically stoppable when said predetermined torque obtains thereby to clamp the workpieces individually in the work-support units with a predetermined pressure, and means cooperative with the drive units respectively for presetting the torque applied to said other driving members thereby to preset said predetermined pressure for clamping the workpieces in their respective work-support units.

2. In a work-handling apparatus for a machine tool process line having a plurality of work stations at which machine operations are carried out on a plurality of like workpieces mounted in a clamped manner on respective like work-support units, said work-support units having first clamp means including first rotary drivable elements to clamp a workpiece therein to hold the workpiece from up and down movement and second clamp means including second rotary drivable elements to move the workpiece laterally and hold it from lateral movement, the improvement which comprises, means defining a work station for receiving successively a plurality of like workpieces mounted on respective like work-support units in an unclamped condition, a clamping arrangement at the last-mentioned station forming a clamping station to clamp the individual workpieces on the respective work-support units comprising, a pair of rotary drive devices positionable in operative positions jointly to rotatably drive the rotatable elements of the first and second clamp means respectively, a support member mounting the two devices and automatically movable to an operative position in which the drive devices are in respective engagement with the rotatable elements of said clamp means and automatically movable to a retracted position in which the drive devices are disengaged from the rotatable elements of the respective clamp means, means responsive to the successive reception of the work-support units at the clamping station to automatically rotatably operate the drive devices when engaged with said rotatable elements to move the workpiece laterally to a predetermined position in the respective unit and clamp it to keep it from lateral movement and to clamp it and keep it from up and down movement, said devices having rotary driving shafts engageable with said drivable elements automatically stoppable when the workpiece is clamped in said position and rotatable driving body members operable automatically to apply a predetermined torque to the first-mentioned rotatable driven elements of the work-supporting units thereby to clamp the workpieces individually in the work-support units with a predetermined pressure, and means cooperative with the drive units respectively for presetting the torque applied to the body members thereby to preset said predetermined pressure for clamping the workpieces in their respective work-support units.

3. In a work-handling apparatus for a machine tool process line having a plurality of work stations at which machine operations are carried out on a plurality of like workpieces mounted in a clamped manner on respective like work-support units, said work-support units having first clamp means including first rotary drivable elements to clamp a workpiece therein to hold the workpiece from up and down movement and second clamp means including second rotary drivable elements to move the workpiece laterally and hold it from lateral movement, the improvement which comprises, means defining a work station for receiving successively a plurality of like workpieces mounted on respective like work-support units in an unclamped condition, a clamping arrangement at the last-mentioned station forming a clamping station to clamp the individual workpieces on the respective work-support units comprising, a pair of rotary drive devices positionable in operative positions jointly to rotatably drive the rotatable elements of the first and second clamp means respectively, a support member mounting the two devices and automatically movable to an operative position in which the drive devices are in respective engagement with the rotatable elements of said clamp means and automatically movable to a retracted position in which the drive devices are disengaged from the rotatable elements of the respective clamp means, means responsive to the successive reception of the work-support units at the clamping station to automatically rotatably operate the drive devices when engaged with said rotatable elements to move the workpiece laterally to a predetermined position in the respective unit and clamp it to keep it from lateral movement, said devices having rotary driving shafts engageable with said drivable elements automatically stoppable when the workpiece is clamped in said position and rotatable driving body members operable automatically to apply a predetermined torque to the first-mentioned rotatable driven elements of the work-supporting units thereby to clamp the workpieces individually in the work-support units with a predetermined pressure, and dynamoteric means cooperative with the drive units respectively for presetting the torque applied to the other driving members thereby to preset said predetermined pressure for clamping the workpieces in their respective work-support units.

4. In a work-handling apparatus for a machine tool process line having a plurality of work stations at which machine operations are carried out on a plurality of like workpieces mounted in a clamped manner on respective like work-support units, said work-support units having clamp means including rotary drivable elements to clamp a workpiece therein, the improvement which comprises, means defining a work station for receiving successively a plurality of like workpieces positioned on respective like work-support units in an unclamped condition, a clamping arrangement at the last-mentioned station forming a clamping station to clamp the individual workpieces on the respective work-support units comprising, at least one rotary drive device positionable in operative positions to rotatably drive the rotatable elements of the clamp means, a support member mounting the device and automatically movable to an operative position in which the drive device is in engagement with the rotatable elements of said clamp means and automatically movable to a retracted position in which the drive device is disengaged from the rotatable elements of the respective clamp means, means responsive to the successive reception of the work-support units at the clamping station to automatically rotatably operate the drive device when engaged with said rotatable elements, said device having a rotary driving member engageable with said drivable elements automatically stoppable when the workpiece is clamped and other rotary driving members operable automatically to apply a predetermined torque to said rotatable driven elements of the work-supporting units and automatically stoppable when said predetermined torque obtains thereby to clamp the workpieces individually in the work-support unit with a predetermined pressure, and means cooperative with the drive unit for presetting the torque applied to said other driving members thereby to preset said predetermined pressure for clamping the workpieces in their respective work-support units.

References Cited in the file of this patent

UNITED STATES PATENTS

| | | |
|---|---|---|
| 2,371,906 | Millholland | Mar. 20, 1945 |
| 2,392,169 | Mansfield | Jan. 1, 1946 |
| 2,559,369 | Phillips | July 3, 1951 |
| 2,570,589 | Phillips | Oct. 9, 1951 |
| 2,659,157 | Aller | Nov. 17, 1953 |
| 2,808,746 | Blomquist | Oct. 8, 1957 |